United States Patent [19]

Takahashi

[11] Patent Number: 4,649,481
[45] Date of Patent: Mar. 10, 1987

[54] ELECTRONIC CASH REGISTER WITH MEANS TO STORE AND CORRELATE DATA ON A CUSTOMER BY CUSTOMER BASIS

[75] Inventor: Hiroshi Takahashi, Tokyo, Japan

[73] Assignee: Casio Computer Co., Ltd., Tokyo, Japan

[21] Appl. No.: 689,849

[22] Filed: Jan. 9, 1985

[30] Foreign Application Priority Data

Jan. 24, 1984 [JP] Japan ................................ 59-9441

[51] Int. Cl.⁴ .............................................. G06F 15/24
[52] U.S. Cl. .................................... 364/405; 364/900
[58] Field of Search ............... 364/404, 405, 900; 235/381, 424, 425, 3, 383; 400/825.35

[56] References Cited

U.S. PATENT DOCUMENTS

| | | | |
|---|---|---|---|
| 4,360,872 | 11/1982 | Suzuki | 364/900 |
| 4,398,250 | 8/1983 | Hosono | 364/404 |
| 4,502,119 | 2/1985 | Tsuzuki | 364/900 |
| 4,530,067 | 7/1985 | Dorr | 364/900 |

Primary Examiner—Jerry Smith
Assistant Examiner—Gail Hayes
Attorney, Agent, or Firm—Frishauf, Holtz, Goodman & Woodward

[57] ABSTRACT

An electronic cash register of the invention can provide a correlation between sales of items or commodities. The electronic cash register has a PLU code data memory. The PLU code data memory stores PLU code data of items purchased by each customer. In order to calculate the number of customers who buy at least one of two items, a CPU retrieves the contents of the PLU code data memory for each customer. When it is determined upon this retrieval operation that a given customer buys at least one of the two items, the corresponding customer number count is incremented by 1. When the retrieval operation is completely for all the contents stored in the PLU code data memory, the desired information is calculated. Similarly, by counting the number of customers who buy one or both of the two items, and the like, correlations between sales of items can be determined.

20 Claims, 16 Drawing Figures

FIG. 3

| 1 | 2 | 1 | PLU |
| 1 | 1 | 3 | PLU |
| | | | SUB |

FIG. 4

| PLU | 1 2 1 |
| | O R |
| PLU | 1 1 3 |
| CPC | 1 3 0 |
| RATE | 1 5.3% |

FIG. 5

| 1 | 2 | 1 | PLU |
| | | | SUB |

FIG. 6

| PLU | 1 2 1 |
| CPC | 5 4 |
| RATE | 8.2% |

FIG. 7

| 1 | 2 | 1 | PLU |
| 1 | 1 | 3 | PLU |
| | | | CA/AMT |

FIG. 8

| PLU | 1 2 1 |
| | A N D |
| PLU | 1 1 3 |
| CPC | 2 6 |
| RATE | 2.3% |

ELECTRONIC CASH REGISTER WITH MEANS TO STORE AND CORRELATE DATA ON A CUSTOMER BY CUSTOMER BASIS

BACKGROUND OF THE INVENTION

The present invention relates to an improvement in an electronic cash register which can count the number of customers who purchase a particular commodity or item on sale and, more particularly, an electronic cash register which has a function to determine a correlation between a specific item on sale and a factor associated therewith, such as another item or hour of the day.

A conventional electronic cash register is known to count the number of customers who purchase items classified into categories. This register counts the number of customers in the following manner. The register has a counter for each category of items. When a customer purchases an item, the corresponding counter is incremented by 1 so that the total number of customers who purchase items of this category can be determined.

However, in such a conventional electronic cash register, the number of customers for each category of items is independently produced when stored data is looked up. This means that the total number of customers who purchase a particular item cannot be determined. It is impossible to determine the number of customers who purchase two particular items, or either of such two particular items. In other words, a correlation between the number of customers who purchase different items, or the number of customers who purchase a particular item at a specific hour cannot be determined. For this reason, associated items cannot be effectively displayed or advertised, and the item display cannot be appropriately changed in accordance with hours.

SUMMARY OF THE INVENTION

The object of the present invention is to provide an electronic cash register which can obtain a correlation between the sales total of a particular item and another factor such as the sales total of another item, an hour or a clerk.

In order to achieve the above object of the present invention, there is provided an electronic cash register comprising:

input means, having a plurality of keys for inputting commodity data on items purchased by customers and boundary code data representing a boundary between each two customers who purchase the items;

memory means for storing the commodity data and the boundary code data inputted by said input means in an order inputted;

designating means for designating a given condition so as to obtain the number of customers who satisfy the given condition;

detecting means for detecting if commodity data of each of data groups of the commodity data bounded by the boundary code data stored in said memory means satisfies the given condition designated by said designating means; and counting means for counting the number of data groups which are detected by said detecting means to satisfy the given condition designated by said designating means.

With an electronic cash register of this construction, the relationship between the sales of a particular item and other factors such as the sales of another item, an hour, or a clerk can be determined. This allows a user to easily determine which items are often bought together with other items, thus providing effective and efficient purchase from wholesalers, displays and advertising of commodities. Trends or changes in demands or choice by customers can also be easily obtained, and clerks can be assigned to the most effective working positions. This contributes to an increased sales total.

BRIEF DESCRIPTION OF THE DRAWINGS

FIGS. 3, 5, 7, 9, 11, 12, 13 and 14 are views showing the key operations for operating the electronic cash register according to the embodiment of the present invention;

FIGS. 4, 6 and 8 are views showing receipts printed out by the electronic cash register according to the embodiment of the present invention.

DETAILED DESCRIPTION OF THE INVENTION

Figure 1:
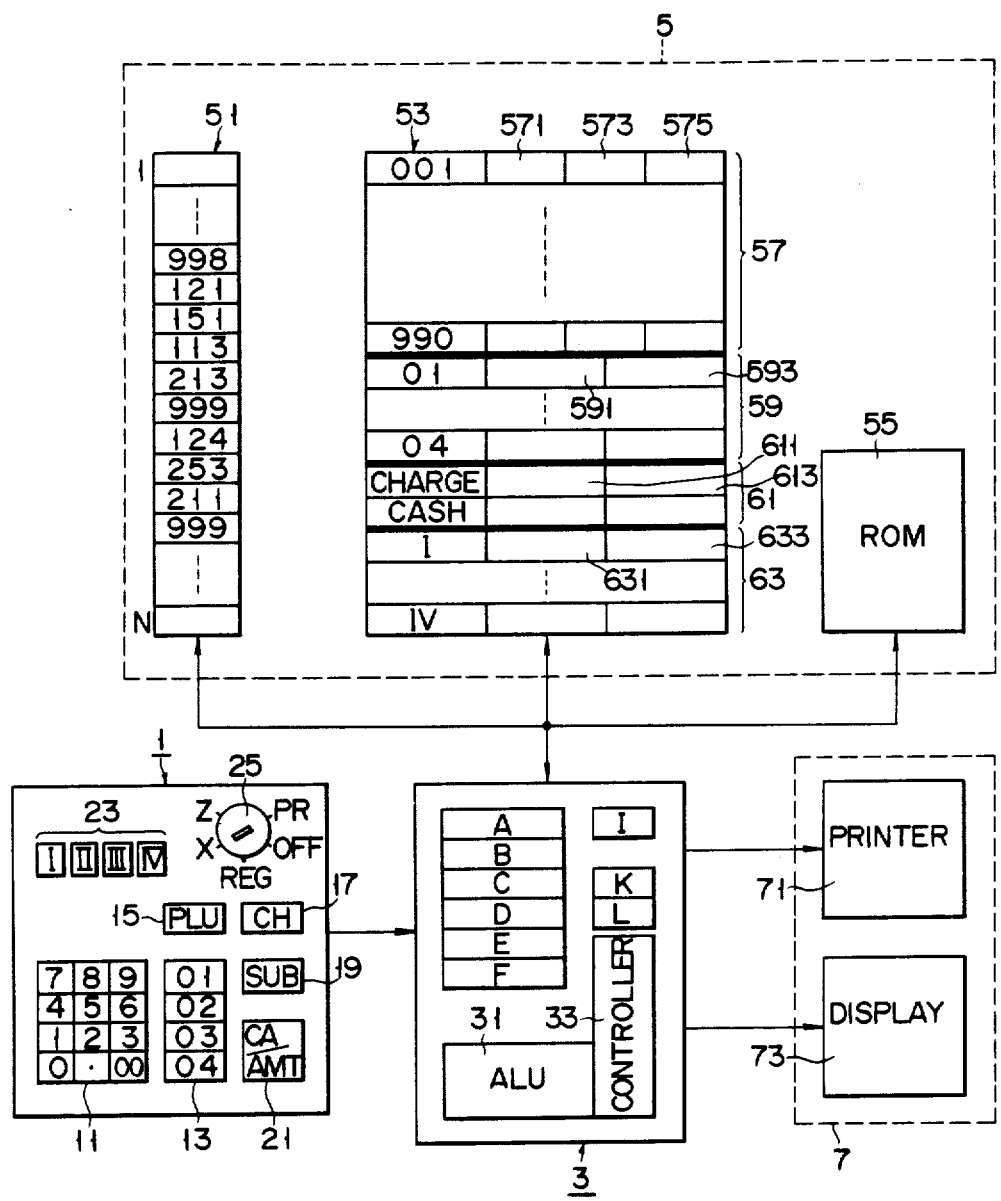
FIG. 1 is a block diagram showing the configuration of a system of an electronic cash register according to an embodiment of the present invention.

The preferred embodiment of the present invention will now be described with reference to the accompanying drawings. The configuration of a system of the electronic cash register according to this embodiment will be described first.

The system of the electronic cash register according to this embodiment has a key input section 1; a CPU 3 connected to the key input section 1; a memory section 5 having a PLU (Price Look Up) code data memory 51, a sum data memory 53 and a ROM 55 which are connected to the CPU 3; and an output section 7 having a printer 71 and a display 73 which are connected to the CPU 73.

The key input section 1 has numeric keys 11, department keys 13, a PLU key 15, a charge key 17, a sub total key 19, a cash amount tendered key 21, clerk keys 23, and a mode switch 25. The PLU key 15 and the numeric keys 11 are used together to input PLU code data. The PLU code data is commodity classification code data which is specific to each type of commodity. For the sake of simplified description, 990 types of PLU code data from "001" to "990" are assumed to be present. The numeric keys 11 are used to input PLU code data, an amount, and the like. The department keys 13 are used to input the department of an item purchased. In this embodiment, four types of departments from "01" to "04" are present. The charge key 17 is used to register a charge payment amount. The sub total key 19 is used to calculate the sub total of sales amounts. The cash amount tendered key 21 is used to register a cash payment amount.

The charge key 17 and the cash amount tendered key 21 are transaction keys used to total the transaction of each customer. The clerk keys 23 are used to designate a clerk operating this particular cash register. The sub total key 19 is used to designate "logic OR" to be described later (to calculate the number of customers who purchase at least one of a plurality of items). The cash amount tendered key 21 is used to designate "logic AND" to be described later (the number of customers who purchase all of designated items). The mode switch 25 is used to set one of the preset mode (PR), the register mode (REG), the read mode (X), the reset mode (Z), and the power-off mode (OFF).

The CPU 3 can be of a general type and has A, B, C, D, E, F, I, K and L registers, an ALU 31 for performing various arithmetic operations, and a control section 33 for performing various control operations. In response to microinstructions stored in the ROM 55, the CPU 3 performs various processing of input data from the keys 1 to 23 and the mode switch 25. The A to L registers are used for general arithmetic operations and for calculating a correlation between items to be described later. The A and B registers store designated PLU code data. The C register stores data representing "logic OR" or "logic AND." The D register stores the contents of the PLU code data memory 51. The E register stores the total number of customers, the F register stores the calculated number of customers, and the I register stores a designating address. When the PLU code stored in the A register is detected during a retrieval operation to be described later, a flag is set in the K register. When the PLU code stored in the B register is detected during a retrieval operation to be described later, a flag is set in the L register.

The PLU code data memory 51 has a memory area of 1 to N addresses and stores input data in the order it is received. The CPU 3 sequentially writes in the PLU code data memory 51, the PLU code data inputted through the key input section 1, the key code data "999" of the cash amount tendered key 21, and the key code data "998" of the charge key 17 in the order they are inputted. As described earlier, the cash amount tendered key 21 and the charge key 17 are transaction keys and are keyed at every sales transaction (registration of each customer). Therefore, the code data "999" and "998" serve as boundary code data which present a boundary between one customer and the next customer. In this manner, the PLU code data memory 51 stores the PLU code data of items purchased in the order inputted.

The sum data memory 53 consists of an item memory 57, a department memory 59, a transaction memory 61, and a clerk memory 63. The item memory 57 has a field 571 for storing the number of items of each PLU code data ("001" to "990") sold, a field 573 for storing the unit price of each type of item, and a field 575 for storing a department link destination address for each type of item. The department memory 59 has a field 591 for storing the number of items sold in each department ("001" to "04"), and a field 593 for storing the total sales amount of these items in each department. The transaction memory 61 has a field 611 for storing the number of items of each transaction type (cash and charge), and a field 613 for storing the total sales amount of these items for each transaction type. The clerk memory 63 has a field 631 for storing the number of items sold by each clerk (I to IV) and a field 633 for storing the total sales amount of each clerk. When PLU code data is input through the key input section 1, the CPU 3 accumulates the number of items sold which is stored in the corresponding field 571 of the item memory 57. In accordance with the department link addresses stored in the field 575, the CPU 3 accumulates the number of items sold and the total sales amount which are stored in the transaction memory 61 and the clerk memory 63. The printer 71 and the display 73 print or display various data under the control of the CPU 3.

The operation of the electronic cash register according to this embodiment will be described with reference to the flow chart shown in FIGS. 2A to 2C, the key operations shown in FIGS. 3, 5 and 7, and the receipts shown in FIGS. 4, 6 and 8. When a sales transaction is registered, the operator inputs the PLU code data of items purchased by a customer from the key input section 1. When input of the data for the items purchased by this customer is completed, the operator depresses the cash amount tendered key 21 in the case of a cash sale or the charge key 17 in the case of a charge sale, thereby calculating the total sales amount for this customer. The PLU code data input by the operator is supplied to the CPU 3. The CPU 3 writes the input PLU code data in the PLU code data memory 51 in the order it is inputted. The CPU 3 also writes the key code data "999" of the cash amount tendered key 21 or the key code data "998" of the charge key 17 in the PLU code data memory 51. Therefore, the PLU code data memory 51 stores the PLU code data and the code data "999" and "998" in the order they are inputted. The CPU 3 accumulates the number of items sold in the field 571 of the memory 57 which corresponds to the input PLU code data. In accordance with the department link addresses stored in the field 575, the CPU 3 accumulates the total number of items sold and the total sales amount in the memory 59 and also accumulates the total number of items sold and the total sales amount in the memorys 61, 63. In this manner, the register operation for each customer is performed. The number of items sold for each PLU code data and the corresponding total sales amount are stored in the item memory 57. The number of items sold for each department and the corresponding total sales amount are stored in the department memory 59. The number of items sold for each type of transaction and the corresponding total sales amount are stored in the transaction memory 61. The number of items sold by each clerk and the corresponding total sales amount are stored in the clerk memory 63.

A method of calculating a correlation between the sales of different items will be described below. As earlier described with reference to the configuration of the system of this embodiment, the A and B registers store the designated PLU code data, and the C register stores data representing a condition to be satisfied by the PLU code data stored in the A and B registers. The D register stores the contents of the PLU code data memory 51, the E register stores the total number of customers, the F register stores the calculated number of customers, and the I register stores the designating address. When the PLU code data stored in the A and B registers is detected during a retrieval operation, a flag is set in the K and L registers. In a description to follow, a method of calculating the number of customers who purchase at least one ("logic OR") of the PLU code data "121" items and the PLU code data "113" items, and its proportion (rate) to the total number of customers will be explained.

First, the mode switch 25 is set in the read mode (X). Next, the PLU code data and a condition to be satisfied are preset. Then, keys "1," "2" and "1" of the numeric keys 11, the PLU key 15, the keys "1," "1" and "3" of the numeric keys 11 and the PLU key 15 are operated in the order shown in FIG. 3. Then, the PLU code data "121" is set in the A register, and the PLU code data "113" is set in the B register. When the operator depresses the sub total key 19 next, the CPU 3 starts the sequence according to the flow chart shown in FIGS. 2A to 2C from START I: In step S1, the CPU 3 sets the value "001" representing "logic OR" in the C register. In step S2, the contents of the D, E and F registers are cleared. In step S3, the initial address "001" of the PLU code data memory 51 is set in the I register. The CPU 3 loads in the D register, the code PLU data, the cash code data "999" or charge code data "998," which is written in the address "001" of the PLU code data memory 51 which is designated by the content of the I register in step S4. In step S5, the CPU 3 checks if the content of the D register is "000." In other words, it is checked if the address designated by the I register has reached an area of the PLU code data 51 in which no data is written. In step S6, the CPU 3 checks if the content of the D register coincides with that of the A register, i.e., if the content of the D register is "121."

When it is determined in step S6 that the contents do not coincide, the control flow advances to step S8. However, if the contents coincide with each other in step S6, the CPU 3 sets a first flag in the K register and the control flow advances to step S8. In step S8, it is checked if the content of the D register coincides with that of the B register, i.e., if the content of the D register is "113." If the contents do not coincide with each other in step S8, the control flow advances to step S10. However, if the contents coincide with each other in step S8, the control flow advances to step S9. In step S9, a second flag is set in the L register. Thereafter, the control flow advances to step S10. In step S10, it is checked if the content of the D register is "999" or "998." That is, the CPU 3 checks if retrieval for one customer has been completed. If the content is neither "999" nor "998" in step S10, the control flow advances to step S11. In step S11, the content of the I register is incremented by 1, i.e., the next address of the PLU code data memory 51 is designated. In this case, the address "002" of the PLU code data memory 51 is designated. In step S12, it is checked if the content of the I register exceeds N, i.e., if the address of the PLU code data memory 51 from which the PLU code data is to be read out next and has exceeded the final address of the PLU code data memory 51. If it is determined in step S12 that the content of the I register has not exceeded N, the control flow returns to step S4. The contents at the address 2 of the PLU code data memory are read out and the flow of steps S4 to S12 is repeated.

When a retrieval operation for one customer has been completed, i.e., when it is determined in step S10 that the content of the D register is "999" or "998," the control flow advances to step S13. In step S13, the content of the E register is incremented by 1, i.e., the number of customers for which the retrieval operation has been performed is set in the E register. Then, the control flow advances to step S14 wherein the content of the C register is discriminated. In this case, since the content of the C register is "001," the control flow advances to step S15. In step S15, it is checked if the flags are set in the K register and/or the L register. If the flags are set in the K and/or L register, i.e., if a customer purchases at least one of the items having the PLU code data "113" and "121," the control flow advances to step S16. In step S16, the content of the F register representing the number of customers who purchased at least one item of these code numbers is incremented by one, thereby updating the F register. In step S17, for the next retrieval operation, the contents of the K and L registers are cleared, and the flow advances to step S11. When it is determined in step S15 that the flag is not set in either of the K and L registers, that is, the customer does not purchase either of the two items, the content of the F register is left non-updated. At this time, since the flag is not set in the K and L registers, the flow advances to step S11 skipping step S17. In step S11, the content of the I register is incremented by 1. Thereafter, the processing of steps S4 to S17 is performed for the next customer. A similar operation is performed for other customers. When the content of the I register reaches the final address N of the PLU code data memory 51, is determined in step S12 and the retrieval operation is completed. When the content of the I register reaches an area of an address of the PLU code data memory 51 in which no data is written, that is, when processing of the stored data is completed, this is determined in step S5. The retrieval operation ends, and the control flow advances to step S18.

At this time, the content of the E register indicates the total number of customers, and the content of the F register indicates the number of customers who purchase at least one of the items of the code data "121" and "113."

When the retrieval operation is completed, the flow goes to the next printing processing. Printing processing is performed in the following manner. In step S18, the CPU 3 reads out the content "121" of the A register and the printer 71 prints "PLU 121" as shown in FIG. 4. In step S19, the CPU 3 checks if data is set in the B register. In this case, the PLU code data "113" is stored in the B register, and the control flow advances to step S20. In step S20, the CPU 3 checks the content of the C register. Since the content of the C register is "001," the control flow advances to step S21 and the printer 71 prints OR. In step S22, the CPU 3 reads out the PLU code data "113" from the B register and prints it out.

In step S23, the content of the F register, i.e., the number of customers (CPC (Commodity Purchased Customers)) who purchase at least one of the items of the PLU code data "121" and "113," and the word "CPC" are printed. The number of customers is assumed to be 130 herein. In step S24, the CPU 3 divides this number of customers by the total number of customers and multiplies the quotient by 100. In other words, the CPU 3 divides the content of the F register by the content of the E register and multiplies the quotient by 100. Thus, the rate of the number of customers who purchase at least one of the items of the PLU code data "121" and "113" to the total number of customers is calculated. Assume that the total number of customers is 850 and the rate is "15.3%." In step S25, the rate and the word "RATE" are printed. In step S26, the contents of the A, B and C registers are cleared for the next processing. In this manner, the number of customers who purchase at least one of specific items, for example, items of the PLU code data "121" and "113," and the rate of such customers occurring in the total number of customers are calculated.

Next, a method for calculating the number of customers who purchase the item of the PLU code data "121" and its rate occurring in the total number of customers will be described. First, the mode switch 25 is set in the X mode. According to the procedures in FIG. 5, the keys "1," "2" and "1" of the numeric keys 11, the PLU key 15 and the sub total key 19 are operated in the order shown in FIG. 5. Then, the PLU code data "121" is set in the A register, and no data is set in the B register.

Therefore, "000" set in step S26 is set in the B register. When the sub total key 19 is operated, the processing of the program START I is started as in the above case. In step S1, "001" is set in the C register. Thereafter, the processing is executed in accordance with the flow chart shown in FIGS. 2A to 2C. At this time, since the content of the B register is "000," in step S8, the content of the D register does not coincide with that of the B register. Therefore, the control flow does not advance to step S9, and the second flag is not set in the L register. In step S15, it is determined that the flag is not set in the L register. Since it is determined in step S19 that the content of the B register is "000," the control jumps to step S23. Thus, neither "OR" nor the content of the B register are printed in steps S20 and S21. Therefore, the number (54 herein) and the word "CPC," the rate (8.2% herein) and the word "RATE" are printed on a receipt as shown in FIG. 6.

In this manner, the number of customers who purchase a particular type of item and a ratio of such customers to the total number of customers can be calculated.

A method of calculating the number of customers who purchase both ("logic AND") of two types of items and a ratio of such customers to the total number of customers will be described with reference to FIGS. 2A to 2C and 7 and 8. For the purpose of description, it is assumed that the number of customers (CPC) who purchase both items of the PLU code data "121" and "113" and the ratio of such customers to the total number of customers are calculated. First, as shown in FIG. 7, the keys "1," "2," and "1" of the numeric keys 11, the PLU key 15, the keys "1," "1" and "3" of the numeric keys, the PLU key 15 and finally the cash amount tendered key 21 for designating "logic AND" are depressed. Then, "121" is set in the A register, and "113" is set in the B register. Unlike the case described above, when the cash amount tendered key 21 is depressed, the processing of the program START II is started. In step S27, a value "010" representing "logic AND" is set in the C register. As in the case of calculating "logic OR" described above, the CPU 3 executes the processing in accordance with the flow chart shown in FIGS. 2A to 2C. As in the above case of "logic OR," the CPU 3 checks if the PLU code data "121" and "113" are stored for each customer (within area bounded by boundary code data "999" and "998") in steps S4 to S12. When the PLU code data "121," "113" are detected, the CPU 3 sets a flag in the K and L registers. When the retrieval operation for one customer is completed, the content of the E register representing the total number of customers is incremented by 1 in step S13. The control flow advances to step S28. When the flags are set in both the K and L registers, the content of the F register representing the target customer number is incremented by 1. When the flag is not set in at least one of the K and L registers, the customer has not purchased at least one of the items and the content of the F register is not operated.

When the retrieval operation is completed for the total number of customers, i.e., the data stored in the PLU code data memory 51, this is determined in step S5 or S12.

The control operation advances to printing processing, and a receipt as shown in FIG. 8 is printed.

In printing processing, the CPU 3 checks in step S20 if the content of the C register is "010." Therefore, in step S29, the printer 71 prints "AND" as shown in FIG. 8. In steps S23 and S25, the printer 71 prints out the word "CPC" and the number of customers who purchase both of the items of the PLU code data "121" and "113," i.e., 26 herein, and the rate of these customers to the total number of customers of 2.3%. In this manner, the number of customers who purchase two items, and the ratio of these customers to the total number of customers can be determined. The number of customers who purchase the item of the PLU code data "113" can be calculated by the same operation as described above. This can be calculated in accordance with $130 - 54 + 26 = 102$ from the value obtained by the above method.

In the above methods, the number of customers who purchase both of the items having the PLU code data "121" and "113," the number of customers who purchase at least one of the items, the number of customers who purchase items of the code data "121," the number of customers who purchase items of the code data "113," and the corresponding rates can be calculated. With these methods, it can be confirmed, for example, that substantially half of the customers who purchase items of the PLU code data "121" purchase items of the code "113," but only a quarter of the customers who purchase items of the code "113" purchase the items of code "121." In this manner, when the electronic cash register of this embodiment is used, the number of customers who purchase a particular item can also be calculated as in conventional cash registers. Furthermore, the number of customers who purchase both of these types of items or at least one of these types of items can be calculated. In this manner, a correlation between sales of two items can be determined. So, for example, it can be confirmed that one type of item sells well with another specific type of item. Then, the buying of items from wholesalers, displays and advertising of items can be effectively performed. For example, associated items can be displayed together to provide good sales effect. Since the ratio of the customers who purchase a particular type of item to the total number of customers can be determined; trends or changes in the demand and choise by customers can be determined.

Figure 9:
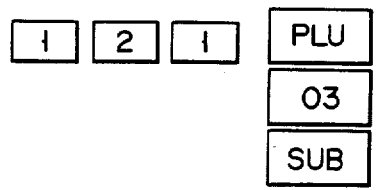

The above embodiment is described with reference to the items having the PLU code data "121" and "113." However, the present invention is not limited to the foregoing. A similar operation can be performed for items having department code data. For example, it is possible to calculate the number of customers who purchase at least one of the items having the PLU code data "121" and an item having department code data "03." The key operations in this case are shown in FIG. 9. In steps S6 and S8 in the flow chart shown in FIGS. 2A to 2C, after the contents of the A and B registers are determined to be the PLU code data or the department code data, the content of the D register is compared with those of the A and B registers.

In step S8, it is checked if the content of the B register is the department code data, and if the PLU code data stored in the D register is included in the department ("03"), the code data which is stored in the B register.

If the PLU code data stored in the D register corresponds to the department code data stored in the B register, the second flag is set in the L register in step S9. Then, a correlation between sales of an item and items of a particular department can be determined.

In this embodiment, in order to calculate the number of customers who purchase both of two items (in order to designate "logic AND"), the cash amount tendered key 21 is operated. Furthermore, in order to calculate the number of customers who purchase at least one of the two items (in order to designate "logic OR"), the charge key 17 is operated. However, the key operations for calculating a correlation are not limited to the method described above.

Figure 10:
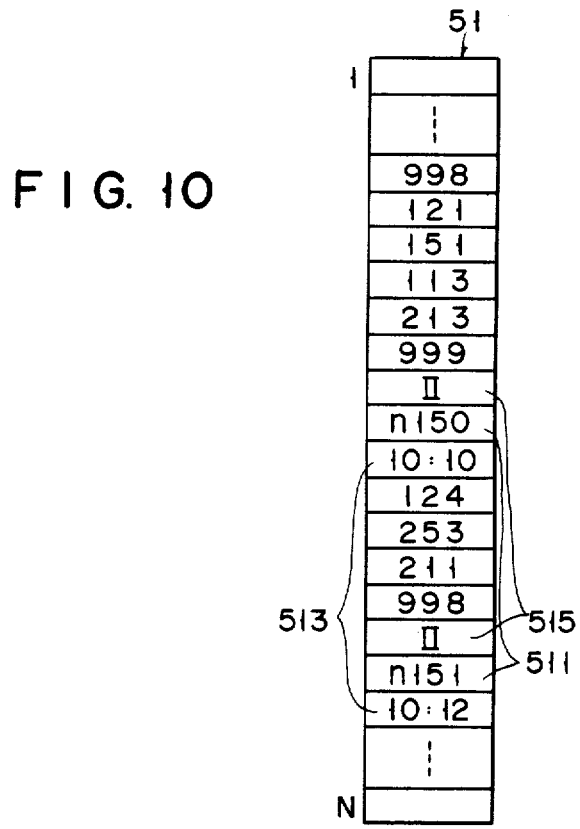
FIG. 10 is a diagram showing an example of memory contents in a PLU code data memory in the electronic cash register according to the embodiment of the present invention.
Figure 11:
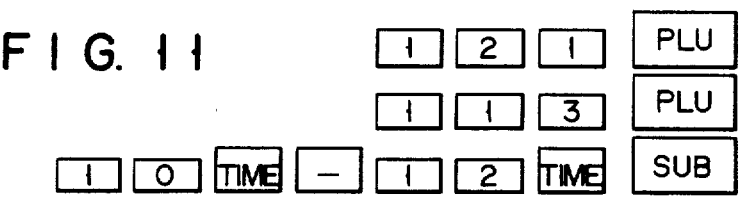

In the above embodiment, the PLU code data memory 51 stores the PLU code data and code data "999" and "998" in the order they are inputted. However, the present invention is not limited to this arrangement. Thus, the PLU code data memory 51 can store data other than PLU code data. For example, the PLU code data memory 51 can store the boundary code "999" or "998" and thereafter receipt numbers 511 (n150 and n151), as shown in FIG. 10. A clock circuit can be incorporated to store times 513 (10:10, 10:12) at which the cash amount tendered key 21 and the charge key 17 are operated. Clerk codes 515 (II) can be stored. When these data are stored, the sales total within a specific hourly range or within a specific receipt number range can be calculated. A method of calculating the number of customers who purchase at least one of the items having the PLU code data "121" and "113" between 10 o'clock and 12 o'clock and the rate of occurrence in the total number of customers, and the key operations for performing this calculation are shown in FIG. 11. A "TIME" key is a key for designating a time range.

Figure 12:
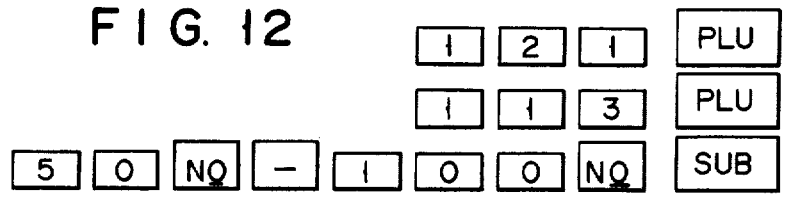
Figure 13:
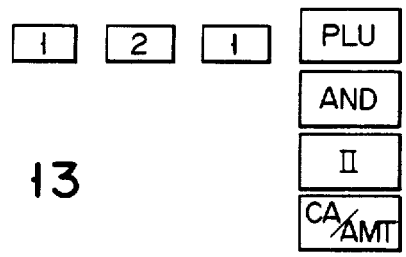

By performing the key operations as shown in FIG. 12, the number of customers who purchase at least one of the items having the PLU code "121" and "113" within a receipt number range of 50 to 100, and the rate of occurrence in the total number of customers can be calculated. A "No" key is a key for designating a number range of receipts (A correlation between a clerk and sales can also be determined). FIG. 13 shows an example of key operations when a customer purchases an item of the PLU code data "121" and a clerk II handles this transaction. An "AND" key is a key for designating "logic AND," and a "II" key is a key for designating the clerk II of the clerk keys 23. Processing can be performed in the following manner. When it is determined in step S10 of the flow chart shown in FIG. 2B that the retrieval operation for one customer is completed, the sales time data, the receipt No data, and the clerk data for a customer are read out and it is checked if these data satisfy the designated condition. When the data are determined to satisfy the designated condition, the contents of corresponding registers are updated. In this manner, details of a demand from a customer and correlations of items sold to customers can be determined. For example, specific items can be advertised within a specific hourly range. A correlation between a clerk and items can be determined. The method of storing data in the memory 51, the key operation, the program processing method and the like are not limited to those described above.

In the above embodiment, the code data "999" and "998" are used to distinguish between cash and charge transactions. Therefore, the number of customers (rate) by cash and charge transactions can be separately determined. In this case, the code data "999" representing the cash transaction and the code data "998" representing the charge transaction are designated first, and then the condition for the item or the like is designated. According to the program processing performed, it is first checked if a specific data group is bounded by the designated boundary code data. It is then checked if the code data group which is bounded by the designated data group satisfies the condition for the item. The number of customers who satisfy the designated condition is counted. However, the present invention is not necessarily limited to this arrangement. The code data for cash and charge transactions need not be different from each other and can be the same. The cash amount tendered key 21 and the charge key 17 are examples of transactions, and another key such as a credit key can be used. In the above embodiment, the PLU code data consist of "001" to "999." However, the number of PLU data is not limited this, and the number of items can be any arbitrary number.

Figure 14:
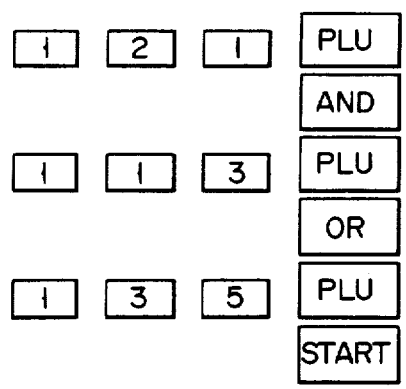

In the above embodiment, two types of PLU code data can be designated, and a condition, i.e., an "AND" or "OR" condition of these two types of data can be designated. However, the number of types of PLU code data is not limited to two. Thus, any number of PLU code data and conditions to be satisfied by such PLU code data can be set. For example, it is possible to calculate the number of customers who do not purchase a specific item (NOT), the number of customers who do not purchase one of a plurality of items (NOR), and the number of customers who purchase none of the plurality of items (NAND), and corresponding ratios to the total number of customers. Also, three or more types of PLU code data can be designated. For example, when the number of customers who purchase both of the items having the PLU code data "121" and "113" or the number of customers (rate) who purchase items having the PLU code data "135" to be calculated, the key operations as shown in FIG. 14 are performed. An "AND" key is a key for designating "logic AND," and an "OR" key is a key for designating "logic OR." A "START" key is a key for designating a start of processing. The input PLU code data, the logic symbols and the like are sequentially stored in the registers or predetermined memories of the CPU 3. The program processing is started when the "START" key is depressed. A retrieval operation can be performed in the following manner. In the embodiment described above, it is checked if the designated PLU code data, the code data "121," "113" and "135" in this case are present for each data group bounded by the boundary code data in the PLU code data memory 51, i.e., for each customer. When the designated code data is present, the flag is set in the corresponding register or memory. When the retrieval operation for one customer is completed, it is checked if each flag satisfies the designated condition. When the condition is satisfied, the number of customers is incremented by 1. When the retrieval operation is completed for all the data in the PLU code data memory 51, the control flow advances to printing processing, and the number of customers and the rate of occurrence in the total number of customers are printed. A key designating brackets can also be incorporated in order to designate any condition of a number of code data.

Figure 2A:
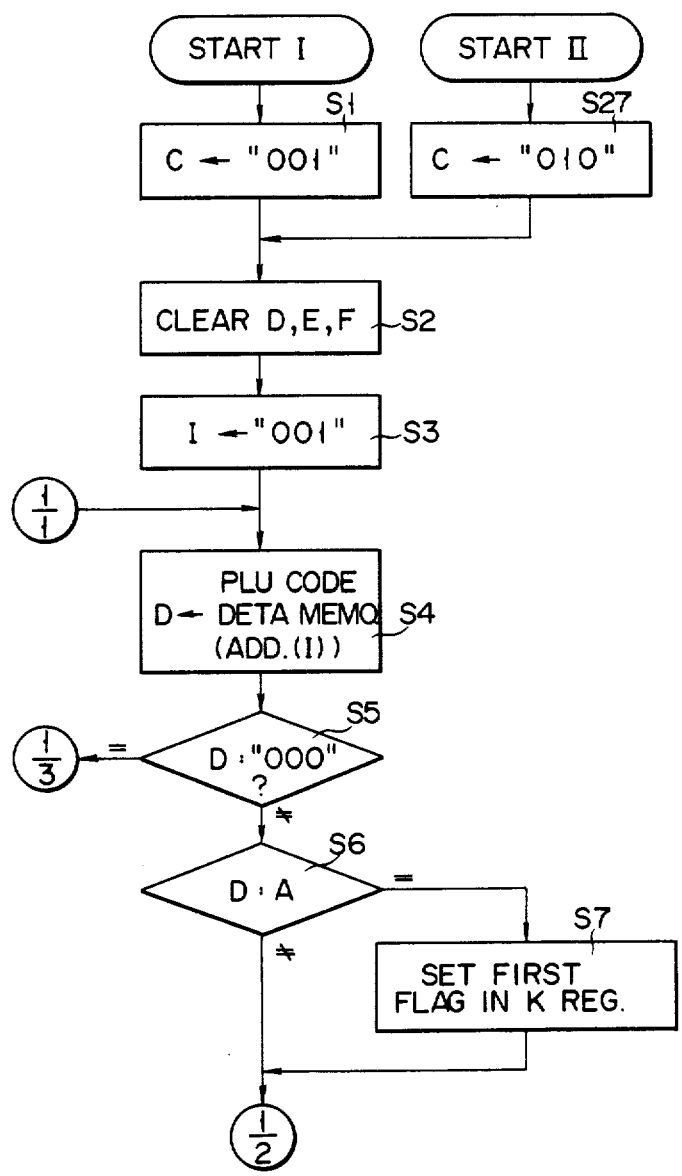
FIGS. 2A to 2C are flow charts for explaining the operation of the electronic cash register according to the embodiment of the present invention.
Figure 2B:
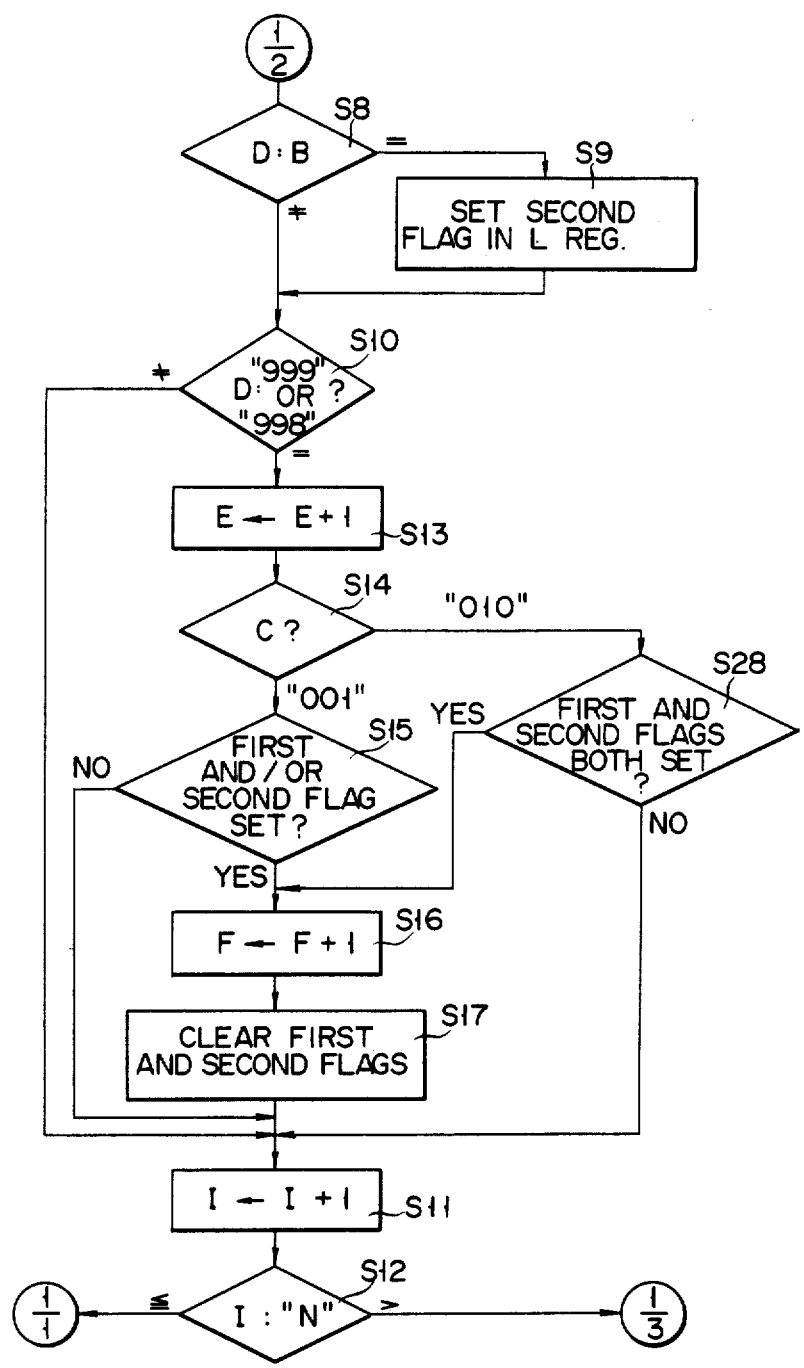
Figure 2C:
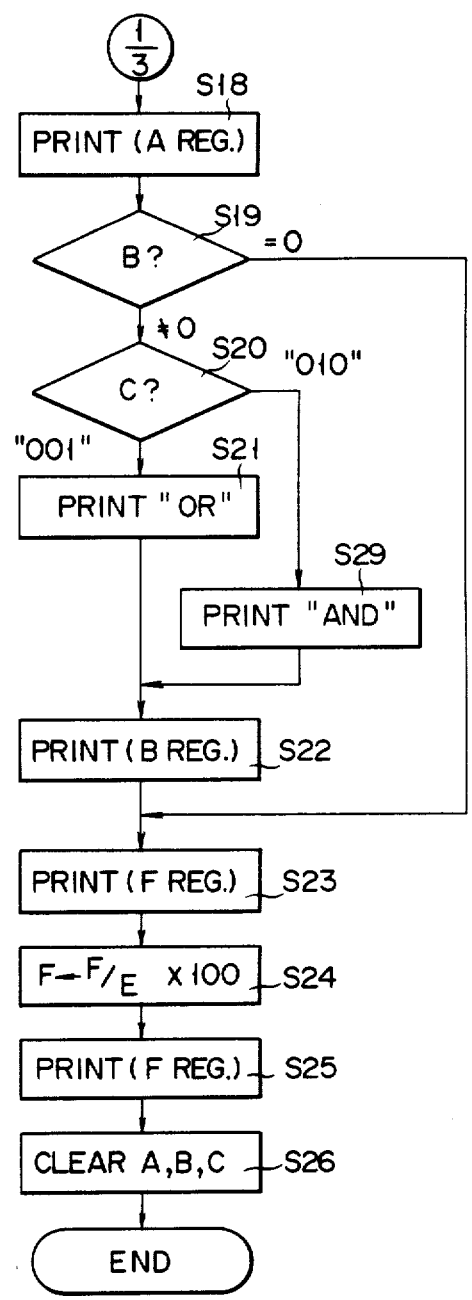

The flow charts shown in FIGS. 2A to 2C are only examples and the operation is not limited to them. The flow charts are described hereinabove with reference to wherein the numbers of customers who purchase at least one or both of two items are calculated, as basic examples. However, other types of calculations can be easily performed by combining these basic flow charts.

In the above embodiment, when the items sold must be changed or refunded, the corresponding data can be erased from the PLU code data memory 51.

What is claimed is:

1. An electronic cash register comprising:
input means, having a plurality of keys for inputting commodity data on items purchased by customers and boundary code data representing a boundary between each two customers who purchase the items, said commodity date including predetermined commodity classification code data for each type of item,
memory means for storing the commodity data and the boundary code data input by said input means in an order input;
designating means for designating at least one commodity classification data and a condition thereof in order to determine the number of customers who purchase at least one item whose commodity classification code data satisfies said condition,
detecting means for detecting whether the commodity classification code data, designated by said designating means and satisfying said condition, are in each of data groups; and
counting means for counting the number of data groups which are detected by said detecting means to satisfy said condition designated by said designating means.

2. An electronic cash register according to claim 1, wherein
said designating means includes means for designating at least two commodity classification code data and "logic OR" thereof in order to calculate the number of customers who purchase at least one of items corresponding to the designated commodity classification code data; and
said detecting means includes means for detecting whether at least one of the commodity classification code data designated by said designating means is in each of the data groups, and for determining that when at least one of the commodity classification code data designated by said designating means is in each of the data groups, the data group satisfies the condition designated by said designating means.

3. An electronic cash register according to claim 2, wherein
said detecting means comprises:
retrieval means for sequentially retrieving contents of said memory means so as to determine if the commodity classification code data designated by said designating means is stored in said memory means;
means for setting a corresponding flag when said retrieval means determine that the commodity classification code data designated by said designating means is stored in said memory means; and
means for discriminating for each of the data groups that at least one flag for the commodity classification code data designated by said designating means is set.

4. An electronic cash register according to claim 1, wherein
said designating means includes means for designating at least two commodity classification code data add "logic AND" thereof in order to calculate the number of customers who purchase all of the items corresponding to the designated commodity classification code data; and
said detecting means includes means for detecting whether all of the commodity classification code data designated by said designating means is in each of the data groups, and for determining that when all of the commodity classification code data designated by said designating means is in each of the data groups, the data group satisifies the condition designated by said designating means.

5. An elctronic cash register according to claim 4, wherein
said detecting means comprises:
retrieval means for sequentially retrieving contents of said memory means so as to determine if the commodity classification code data designated by said designating means is stored in said memory means;
means for setting a corresponding flag when said retrieval means determine that the commodity classification code data designated by said designating means is stored in said memory means; and
means for discriminating for each of the data groups that flags for all of the commodity classification code data designated by said designating means are set.

6. An electronic cash register according to claim 1, wherein
the commodity data includes time data representing a time of registration of a sales amount for each customer;
said designating means further designates a specific hourly range so as to determine the number of customers who purchase at least one item in the hour range; and
said detecting means further detects for each of the data groups that the time data are in the hour range designated by said designating means.

7. An electronic cash register according to claim 1, wherein
the commodity data includes receipt number data representing a registration number of a sales amount for each customer;
said designating means further designates receipt numbers so as to determine the number of customers having receipt numbers between the receipt numbers designated thereby; and
said detecting means further detects for each of the data groups that the receipt number data is between the receipt numbers designated by said designating means.

8. An electronic cash register according to claim 1, wherein
the commodity data includes clerk data representing a clerk registering a sale for each customer;
said designating means further designates given clerk data so as to determine the number of customers whom a given clerk served; and
said detecting means further detects for each of the data groups that the clerk data coincides with the clerk data designated by said designating means.

9. An electronic cash register according to claim 8, further comprising printer means for printing a ratio calculated by said calculating means.

10. An electronic cash register according to claim 1, wherein
the commodity data includes time data representing a time of registration of a sale for each customer, receipt number data representing a receipt number of a sale for each customer, and clerk data representing a clerk handling registration of a sale for each customer;
said designating means further designates a time range so as to calculate the number of customers who satisfy the condition within the time range, given receipt numbers so as to calculate the number of customers who satisfy the condition between the given receipt numbers, and given clerk data so as to calculate the number of customers who satisfy the condition for each clerk; and said detecting means further detects for each of the data groups that the time data corresponds to the time range designated by said designating means, that the receipt number data corresponds to receipt numbers between the receipt numbers designated by said designating means, and that the clerk data coincides with the clerk data designated by said designating means.

11. An electronic cash register according to claim 1, comprising:
means for detecting the number of all the data groups stored in said memory means; and
means for calculating a rate of the number of data groups which is counted by said counting means to the total number of data groups.

12. An electronic cash register according to claim 1, wherein
said input means includes a plurality of transaction keys, and said input means inputs boundary code data corresponding to the transaction key which is operated;
said designating means includes means for designating a type of transaction keys; and
said detecting means detects that the commodity data of the data group satifies the condition designated by said designating means for each of the data groups bounded by the boundary code data corresponding to the transaction key designated by said designating means.

13. An electronic cash register comprising:
input means, having a plurality of keys, for inputting predetermined commodity data on items purchased by customers and boundary code data representing a boundary between each two customers;
memory means for storing the commodity data and the boundary data input by said input means in an order input;
designating means for designating at least two commodity data and "logic OR" thereof in order to calculate the number of customers who purchase at least one of items corresponding to the designated commodity data;
detecting means for detecting if at least one of the commodity data designated by said designating means is in each of data groups bounded by the boundary code data of the commodity data stored in said memory means; and
counting means for counting the number of data groups for which at least one of the commodity code data designated by said designating means is stored.

14. An electronic cash register according to claim 13 further comprising:
means for detecting the number of data groups stored in said memory means; and
means for calculating a rate of the number of data groups counted by said counting means to the total number of data groups.

15. An electronic cash register according to claim 13, wherein
said detecting means comprises
retrieval means for sequentially retrieving data of said memory means so as to determine if commodity data designated by said designating means is stored in said memory means;
means for setting a corresponding flag when the commodity data designated by said designating means is stored in said memory means; and
means for determining for each of the data groups if at least one flag is set.

16. An electronic cash register comprising:
input means, having a plurality of keys, for inputting predetermined commodity data on items purchased by customers and boundary code data representing a boundary between each two customers;
memory means for storing the commodity code data and the boundary code data input by said input means in an order input;
designating means for designating at least two commodity code data and "logic AND" thereof in order to calculate the number of customers who purchase all of items corresponding to the designated commodity data;
detecting means for detecting, for each of data groups bounded by the boundary code data of the commodity data stored in said memory means if both of at least two commodity data designated by said designating means are stored in said memory means; and
counting means for counting the number of data groups which are detected by said detecting means to include the commodity data designated by said designating means.

17. An electronic cash register according to claim 16 further comprising:
means for detecting the number of data groups stored in said memory means; and
means for calculating a rate of the number of data groups counted by said counting means to the total number of data groups.

18. An electronic cash register according to claim 16, wherein
said detecting means comprises
retrieval means for sequentially retrieving data of said memory means so as to determine if the commodity data designated by said designating means is stored in said memory means;
means for setting a corresponding flag when the commodity data designated by said designating means is stored in said memory means; and
means for determining each of the data groups if flags for all the commodity data designated by said designating means are set.

19. An electronic cash register comprising:
input means, having a plurality of keys for inputting commodity data on items purchased by customers and boundary code data representing a boundary between each two customers who purchase the items;
memory means for storing the commodity data and the boundary code data input by said input means in an order input;
designating means for designating a given condition so as to obtain the number of customers who satisfy the given condition;
detecting means for detecting if commodity data of each of data groups of the commodity data bounded by the boundary data stored in said memory means satifies the given condition designated by said designating means;

counting means for counting the number of data groups which are detected by said detecting means to satisfy the given condition designated by said designating means;

means for detecting the number of all the data groups stored in said memory means; and means for calculating a rate of the number of data groups which is counted by said counting means to the total number of data groups.

20. An electronic cash register comprisng:

input means, having a plurality of keys for inputting commodity data on items purchased by customers and boundary code data representing a boundary between each two customers who purchase the items, said input means having a plurality of transaction keys including at least one transaction key for inputting data representing an end of a sales registration for each customer, said input means inputting the commodity data of the items purchased by each customer and the boundary code data in response to an operation of said transaction keys, said boundary code data corresponding to the transaction key which is operated;

memory means for storing the commodity data and the boundary code data input by said input means in an order input;

designating means for designating a given condition so as to obtain the number of customers who satisfy the given condition, and for designating a type of transaction keys;

detecting means for detecting whether the commodity data of each of data groups of the commodity data bounded by the boundary data stored in said memory means satisfies the given condition designated by said designating means for each of the data groups bounded by the boundary code data corresponding to the transaction key disignated by said designating means; and counting means for counting the number of data groups which are detected by said detecting means to satisfy the given condition designated by said designating means.

* * * * *